April 13, 1926. 1,580,822
C. GIUDICE
AUTOMOBILE HOOD AND CURTAIN
Filed May 5, 1925
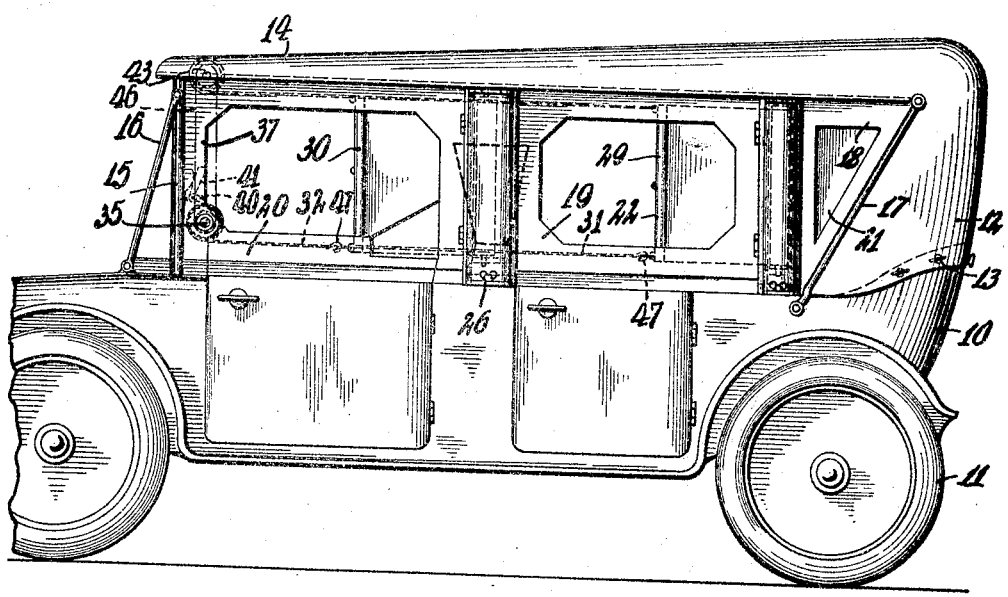
Fig. 1
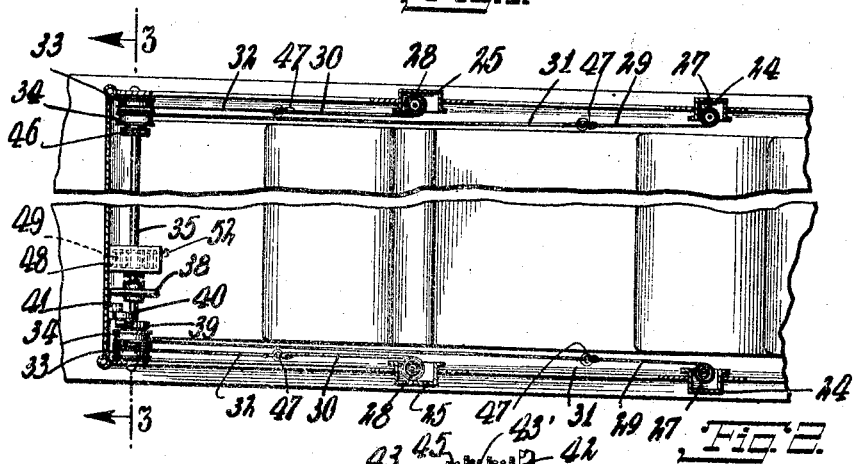
Fig. 2
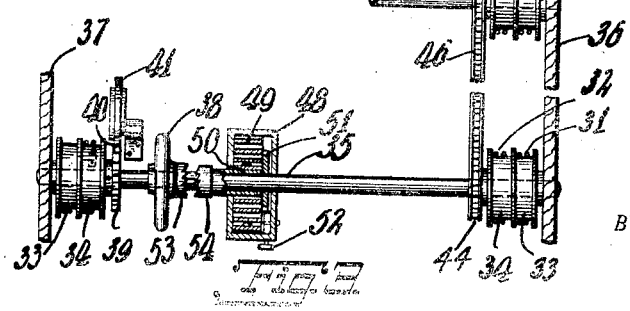
INVENTOR.
Calogero Giudice
BY
ATTORNEYS.

Patented Apr. 13, 1926.

1,580,822

UNITED STATES PATENT OFFICE.

CALOGERO GIUDICE, OF BROOKLYN, NEW YORK, ASSIGNOR OF ONE-HALF TO VITO CASTAGNA, OF BROOKLYN, NEW YORK.

AUTOMOBILE HOOD AND CURTAIN.

Application filed May 5, 1925. Serial No. 28,072.

*To all whom it may concern:*

Be it known that I, CALOGERO GIUDICE, a subject of the King of Italy, residing at Brooklyn, in the county of Kings and State of New York, have invented certain new and useful Improvements in Automobile Hoods and Curtains, of which the following is a specification.

This invention relates to improvements in automobiles, more particularly, to improvements of the side curtains of the automobile hoods, and it is the principal object of the invention to provide an automobile hood with means for drawing the curtains simultaneously from the driver's seat by one single operation for releasing the same in order to protect the interior of the car against sudden rainfalls, storms, or the like.

Another object of the invention is the provision of a curtain operating means of simple and inexpensive construction adapted to be readily installed on any make of car without the necessity of materially changing its construction.

A further object of the invention is the provision of a device of this character which allows the simultaneous drawing of the curtains to any desired extent, to close the windows in the side curtains to a greater or lesser degree, and which will give an inexpensive car the appearance of a car of considerable value.

A still further object of the invention is the provision of an automobile curtain operating device of the above type allowing free access to and egress from the body of the car and a separate operation of the rear and front curtains, if this is desired.

These and other objects and advantages of the invention will become more fully known as the description thereof proceeds, and will then be specifically defined in the appended claims.

In the accompanying drawing, forming a material part of this disclosure:

Fig. 1 is a side elevation of an automobile equipped with a curtain-drawing device according to the present invention.

Fig. 2 is a sectional top plan view thereof.

Fig. 3 is a section on line 3—3 of Figure 2 on an enlarged scale.

An automobile of any desired type has a body 10 on wheels 11, and a hood 12 thereon, which is secured near its lower rear end by means of wing-nut bolts 13, to the body. The hood 12 carries a top 14 on the customary support and braces 15 and 16 and 17, and side curtains 18, 19, and 20, which have window openings 21, 22, and 23 respectively.

The body has on the upper edges of its sides channel-irons 24 and 25, of substantially U-shaped cross-section, erected and secured thereto by any suitable means, for instance, as indicated at 26. In these channel-irons, are rotatably mounted curtain rollers 27 and 28 about which the side curtains 29 and 30 are wound and which are equipped with the usual roller curtain springs to automatically wind the curtains about said rollers.

The curtains have cables 31 and 32 attached thereto near their lower edges, which are wound about or guided on pulleys 33 and 34 on a shaft 35, and it is to be understood that the pulleys are pairwise near each side of the car, and that the shaft 35 is journaled in side bars 36 and 37 of the hood frame.

The shaft 35 carries in front of the driver's seat a hand wheel 38 for rotating said shaft in order to draw the curtains.

The parts are locked in their respective positions when the curtains are drawn, by means of a ratchet 39 on shaft 35 which is engaged by a part 40 adapted to be operated by a lever 41.

The cables secured to the upper parts of the curtains are guided over pulleys 42 and 43', secured on the upper shaft 43 parallel to shaft 35 and also journaled in the frame bars 36 and 37.

Shafts 35 and 43 carry sprocket wheels 44 and 45 thereover which a chain 46 is guided.

In order to allow a convenient access to and egress from the car the curtain operating cables 31 and 32, are each made in two parts connected at their meeting ends by suitable hooks 47 or the like, allowing a quick separation and connection of the cable parts.

Shaft 35 carries also a drum 48 having in its interior an opening 49 attached at one end to the drum and at its other end to a sleeve 50 in shaft 35, while a ratchet wheel 51 is engaged by a pawl adapted to be operated by a knob and pin 52 from the outside of the drum 48 to allow a quick winding and unwinding of the curtains and a stop at any desired point.

The operation of the device will be entirely clear from the above description.

If it is desired to draw the curtains, the pawl 40 is released from its engagement with the ratchet 39 by the proper operation of lever 41, and the shafts 35 and 43 are rotated by means of the hand wheel 38 through the intermediary of the sprocket wheels and chain to simultaneously and uniformly draw the rear and front curtains, whereafter the parts are locked again by bringing pawl 40 into engagement with ratchet 39. If the engagement is again interrupted, the curtains will be automatically wound about their rollers, as is well known with window curtains. Persons may readily enter the car and leave the same by disconnecting the cable parts by the proper manipulation of hooks 47. If a quick and simultaneous drawing of the curtains is desired, this can be effected by the proper manipulation of knob and pin 52. In order to couple the opening drum 48 with the hand wheel 38 the same is made integrally with a coupling member 53 adapted to be shifted into engagement with a coupling member 54 on the drum 48.

While I here described and illustrated the preferred form of my invention, it is to be understood that such changes may be made in the general arrangement and in the construction of the minor details thereof, as fall within the scope of the appended claims without departure from the spirit and principle of the invention.

Having thus described my invention, what I claim as new, and desire to secure by Letters Patent, is:

1. A curtain operating device for cars, comprising a plurality of vertically disposed channel-bars erected on the car frame, a spring controlled curtain roller in each of said channel-bars, a curtain wound about each of said rollers, cables made in parts attached to the upper and lower end parts of said curtains, means for separably connecting the parts of said cables, shafts in front of the driver's seat, a hand wheel for rotating said shafts, means for winding said cables upon the operation of said wheel simultaneously and uniformly to draw said curtains, and a means for locking said shafts in their adjusted positions.

2. A curtain operating device for cars comprising a plurality of spring-rollers, curtains on said rollers, cables made in parts attached to the upper and lower ends of said curtains, means for separably connecting the parts of said cables, shafts in front of the driver's seat, pulleys on said shafts on which said cables are wound to draw the curtains, means for operating said shafts to wind the cables about said pulleys and a means for locking said shafts in their adjusted positions.

3. A curtain operating device for cars, comprising a plurality of spring-rollers, curtains on said rollers, cables made in parts secured to the free outer ends of said curtains, at the top and bottom edges, means for separably connecting the parts of said cables, an upper and a lower shaft in front of the driver's seat, a hand wheel on the lower of said shafts, pairwise arranged pulleys on said shafts adapted to facilitate the winding of said cables, a pair of sprocket wheels on said shafts, a chain guided over said wheels, a ratchet wheel on the lower shaft, a pawl engaging said ratchet, and an operating lever for engaging said pawl with said ratchet to lock said shafts in their adjusted positions, the release of said pawl and ratchet engagement allowing an automatic winding of said curtains on said rollers under the spring action.

4. A curtain operating device for cars, comprising a plurality of spring controlled rollers, curtains on said rollers, cables made in parts secured to the free outer ends of said curtains at the top thereof and bottom edges, hooks for separably connecting the parts of said cables, an upper and a lower shaft in front of the driver's seat, a drum on the lower of said shafts, a spring in said drum, a ratchet on said drum, a pawl engaging said ratchet, and a knob-pin controlling said pawl, a hand wheel on said lower shaft and means for coupling said hand wheel with said drum, pairwise arranged pulleys on said shafts adapted to facilitate the winding of said cables, a pair of sprocket wheels on said shafts, a chain guided over said wheels, and hand operated means for allowing a coupling of said hand wheel and drum for operating said curtains quickly, singly and collectively.

In testimony whereof I have affixed my signature.

CALOGERO GIUDICE.